United States Patent
Gal-On et al.

(10) Patent No.: US 11,080,195 B2
(45) Date of Patent: Aug. 3, 2021

(54) METHOD OF CACHE PREFETCHING THAT INCREASES THE HIT RATE OF A NEXT FASTER CACHE

(71) Applicant: Marvell International Ltd., Hamilton (BM)

(72) Inventors: Shay Gal-On, Mountain View, CA (US); Srilatha Manne, Seattle, WA (US); Edward McLellan, Holliston, MA (US); Alexander Rucker, Stanford, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 42 days.

(21) Appl. No.: 16/566,015

(22) Filed: Sep. 10, 2019

(65) Prior Publication Data
US 2021/0073132 A1    Mar. 11, 2021

(51) Int. Cl.
*G06F 12/08* (2016.01)
*G06F 12/0862* (2016.01)

(52) U.S. Cl.
CPC .... *G06F 12/0862* (2013.01); *G06F 2212/602* (2013.01)

(58) Field of Classification Search
None
See application file for complete search history.

(56) References Cited

U.S. PATENT DOCUMENTS

| | | | | |
|---|---|---|---|---|
| 6,012,125 A * | 1/2000 | Tran | ......... | G06F 9/382 711/125 |
| 6,122,729 A * | 9/2000 | Tran | ......... | G06F 9/30152 712/244 |
| 9,836,291 B1 * | 12/2017 | Gschwind | ......... | G06F 8/447 |
| 2005/0268046 A1 * | 12/2005 | Heil | ......... | G06F 12/0862 711/137 |
| 2018/0024765 A1 * | 1/2018 | Gschwind | ......... | G06F 9/44521 711/171 |
| 2018/0024834 A1 * | 1/2018 | Gschwind | ......... | G06F 8/434 712/229 |
| 2019/0361810 A1 * | 11/2019 | Naor | ......... | G06F 17/18 |

* cited by examiner

*Primary Examiner* — Kevin Verbrugge

(57) ABSTRACT

The size of a cache is modestly increased so that a short pointer to a predicted next memory address in the same cache is added to each cache line in the cache. In response to a cache hit, the predicted next memory address identified by the short pointer in the cache line of the hit along with an associated entry are pushed to a next faster cache when a valid short pointer to the predicted next memory address is present in the cache line of the hit.

20 Claims, 5 Drawing Sheets

METHOD OF CACHE PREFETCHING THAT INCREASES THE HIT RATE OF A NEXT FASTER CACHE

BACKGROUND OF THE INVENTION

1. Field of the Invention

The present invention relates to caches and, more particularly, to a method of cache prefetching that increases the hit rate of a next nearer cache.

2. Description of the Related Art

Cache prefetching is a well-known approach to reducing the latency associated with accessing the instructions and data stored in the main memory of a computer system. Computer systems commonly include a processor, a small L1 instruction cache (e.g., 32 KB-64 KB), a small L1 data cache, additional cache levels of increasing size (e.g., L2 128 KB-1 MB, L3 4 MB-128 MB), and a very large main memory (e.g., 16 GB-1 TB).

Very frequently used information is stored in the L1 caches, which typically requires three to four clock cycles for the processor to obtain the information. Frequently used information is stored in the L2 cache, which typically requires 12 to 25 clock cycles for the processor to obtain the information. Less frequently used information is stored in successive levels of the cache hierarchy or in the main memory, which can require 100 clock cycles or more for the processor to obtain the information.

Cache prefetching attempts to predict the information that the processor will need, and then obtain and store the information in the L1 caches before the processor requests the information so that when the information is needed the processor can access it quickly. When successful, the memory latency can be reduced by 10 to 100 clock cycles, depending on where the information is stored, down to 3-4 clock cycles. In many cases, there is a need to increase the success rate of this mechanism.

SUMMARY OF THE INVENTION

The present invention provides an approach to cache prefetching that increases the hit rate of a nearer cache. A method of cache prefetching includes determining whether a cache has received a read request from a next faster cache. The read request includes a currently requested memory address. The method also includes determining whether the currently requested memory address is stored in the cache when a read request has been received, and outputting an entry associated with the currently requested memory address to the next nearer cache when the currently requested memory address is stored in the cache. In addition, the method includes determining whether a cache line with the currently requested memory address has a valid short pointer to a predicted next memory address. Further, the method includes pushing the predicted next memory address and an entry associated with the predicted next memory address to the next faster cache when the cache line with the currently requested memory address has a valid short pointer.

The present invention also provides a computer system that includes a memory and a processor coupled to the memory to execute instructions stored in the memory. The processor to determine whether a cache has received a read request from a next faster cache. The read request includes a currently requested memory address. The processor to also determine whether the currently requested memory address is stored in the cache when a read request has been received, and output an entry associated with the currently requested memory address to the next nearer cache when the currently requested memory address is stored in the cache. In addition, the processor to determine whether a cache line with the currently requested memory address has a valid short pointer to a predicted next memory address. Further, the processor to push the predicted next memory address and an entry associated with the predicted next memory address to the next nearer cache when the cache line with the currently requested memory address has a valid short pointer.

The present invention further provides a non-transitory computer-readable medium that has computer-readable instructions stored thereon which, when executed by a processor, cause the processor to execute a method of cache prefetching. The method includes determining whether a cache has received a read request from a next faster cache, the read request including a currently requested memory address. The method also includes determining whether the currently requested memory address is stored in the cache when a read request has been received, and outputting an entry associated with the currently requested memory address to the next faster cache when the currently requested memory address is stored in the cache. In addition, the method includes determining whether a cache line with the currently requested memory address has a valid short pointer to a predicted next memory address. Further, the method includes pushing the predicted next memory address and an entry associated with the predicted next memory address to the next faster cache when the cache line with the currently requested memory address has a valid short pointer.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Figure 1:
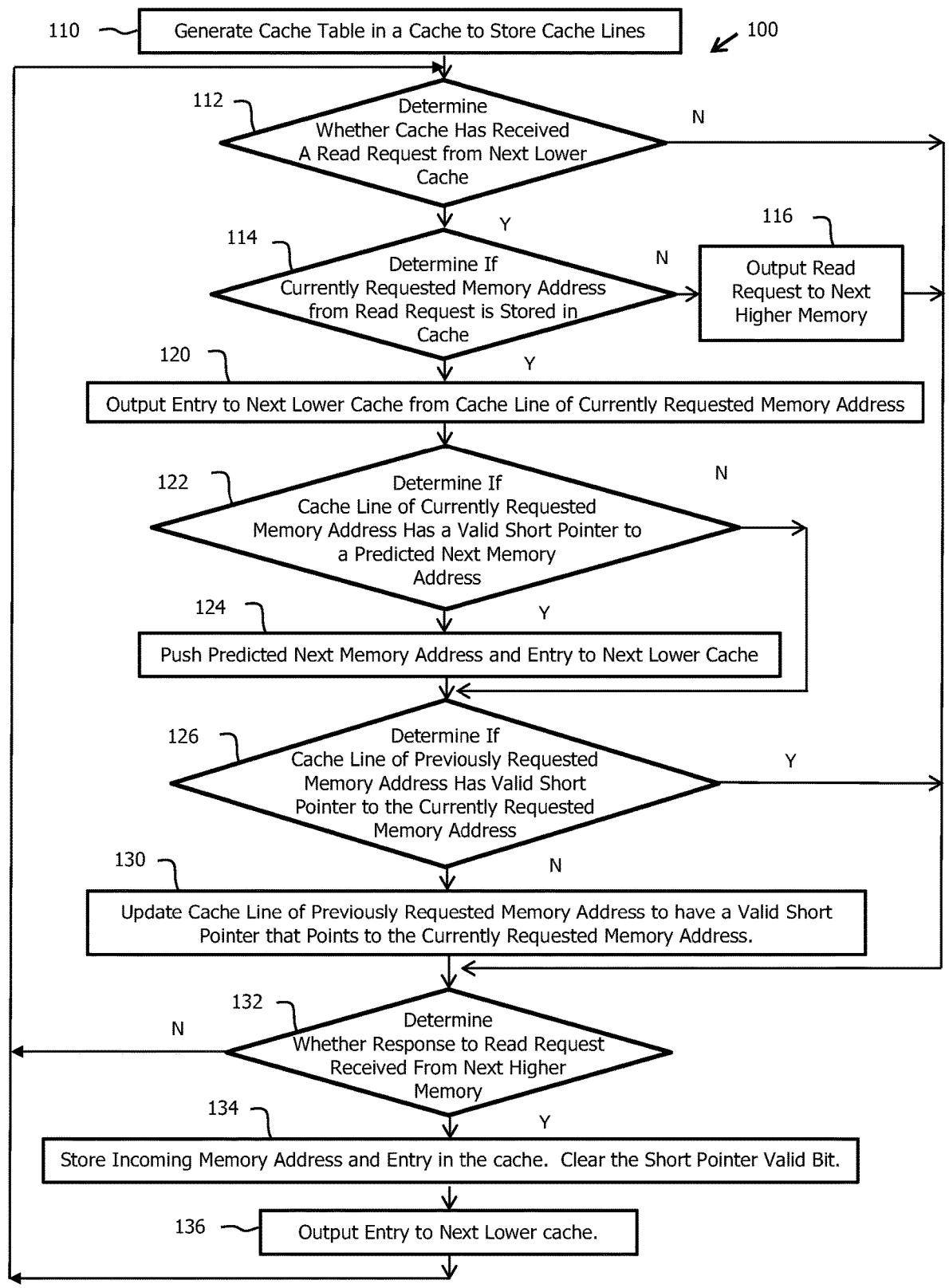
FIG. 1 is a flow chart illustrating an example of a method 100 of cache prefetching in accordance with the present invention.

FIG. 1 shows a flow chart that illustrates an example of a method 100 of cache prefetching in accordance with the present invention. A cache is initially completely invalid and records instructions (and/or other data) after execution by the processor. Since a cache is smaller than the memory it is representing, only a portion of the data can be stored. The hardware structure (e.g. address selection, associativity, replacement algorithms) maps how and what post-execution data is stored in the smaller cache.

As described in greater detail below, in the present invention, limited additional information is stored after execution to improve future performance through directed prefetching that is only used the next time the instruction sequence starts execution. Each cache line in the present invention has a short pointer that points to a predicted next address in the same cache, which can be used by prefetch operations to update or push data to the next fastest cache. By definition, caches can be implemented in multiple levels (e.g., L1, L2, L3, L4, etc.) whereby the nearest, and often smallest level (sometimes called the upper or highest level) to the processor offers the fastest access times for the most frequently used information. Additional levels, sometimes called lower levels, are often larger and provide less frequently used data at slower access times. Even the lowest level caches are still faster than accessing main memory. For example, an L4 cache can receive a read request from an L3, L2, or L1 cache; an L3 cache can receive a read request from an L2 or L1 cache; and an L2 cache can receive a read request from an L1 cache. The L1 caches is typically the fastest cache; the L2 cache is slower than the L1 cache, but faster than the L3 and L4 caches; and the L3 cache is slower than both the L1 and L2 caches, but faster than the L4 cache; etc.

Caches are commonly organized with sets and ways. For example, a 1 MByte cache can be organized to have 1024 sets, 16 ways per set, and 64 Bytes (512 bits) per way. Table 1 shows an example of a 1 MByte cache organized with 1024 sets, 16 ways, and 64 Bytes (512 bits) per way. In this example, a 64-byte cache line is then stored in each way.

TABLE 1

| Set | Way1 | Way2 | Way3 | Way4 | Way5 | ... | Way15 | Way16 |
| --- | --- | --- | --- | --- | --- | --- | --- | --- |
| 0 | 64B (512b) | 64B (512b) | 64B (512b) | 64B (512b) | 64B (512b) | ... | 64B (512b) | 64B (512b) |
| 1 | | | | | | | | |
| ... | | | | | | | | |
| 1023 | | | | | | | | |

In accordance with the present invention, the size of the cache is modestly increased such that each cache line in the cache also has a short pointer that points to another location in the same cache where the next memory address is predicted to be found. Table 2 shows an example of the 16 ways of a set 0 of a cache table, which includes a cache line with an entry valid bit, a memory address, an entry for data or an instruction, and a short pointer to a predicted next memory address.

TABLE 2

| Way (Cache Line) | Entry Valid | Memory Address | Entry Data/ Instruction | Short Pointer to Predicted Next Memory Address (Set (10), Way (4), Valid Pointer (1), Unassigned (1)) |
| --- | --- | --- | --- | --- |
| 1 | | | | |
| 2 | | | | |
| ... | | | | |
| 16 | | | | |

Since the short pointer in the cache line need only point to another location within the same cache, only 16 bits are required: 10 bits for the set, 4 bits for the way, one bit for valid/invalid pointer, and one unassigned bit. In contrast, a full address is 48 bits long using long mode in the ARM architecture.

Thus, one of the advantages of the present invention is that the present invention provides the previously expensive ability to associate a predicted next address pointer with each cache line. Even very large programs typically execute highly repeatable access patterns that fit within large caches. As a result, the predicted next address pointer has a high accuracy rate.

As shown in FIG. 1, method 100 begins at 110: generate a cache table in a cache to store cache lines; then moves to 112 to determine whether a cache has received a read request from a next smaller cache, such as an L2 cache receiving a read request from an L1 cache, or an L3 cache receiving a read request from an L2 cache. The read request from the next smaller cache requests the entry (data or instruction) stored at a currently requested memory address.

When a read request has been received, method 100 moves to 114 to determine whether the currently requested memory address from the read request is stored in the cache. When the currently requested memory address is not stored in the cache, method 100 moves to 116 to output a read request to a next larger memory, such as an L2 cache sending a read request to an L3 cache or a main memory, or an L3 cache sending a read request to a main memory. The read request to the next larger memory/cache requests the entry (data or instruction) stored at the currently requested memory address.

When the currently requested memory address is stored in the cache, method 100 moves to 120 to output the entry (data or instruction) stored in the cache line of the currently requested memory address to the next smaller cache, such as from an L2 cache to an L1 cache, or from an L3 cache to an L2 cache. Following this, method 100 moves to 122 to determine whether the cache line of the currently requested memory address has a valid short pointer to a predicted next memory address.

When the cache line with the requested memory address has a valid short pointer to a predicted next memory address, method 100 moves to 124 where the predicted next memory address and entry are pushed from the cache to the next smaller cache, such as an L2 cache pushing to an L1 cache, or an L3 cache pushing to an L2 cache.

Thus, another of the advantages of the present invention is that once the predicted next memory address has been identified from the short pointer, the memory address and the entry associated with the memory address are pushed to the next smaller cache which, in turn, increases the hit rate of the next smaller cache.

Following the push, method 100 moves to 126 to determine whether the cache line of the previously requested memory address has a valid short pointer to the currently requested memory address. Method 100 also moves to 126 from 122 when a valid short pointer to a predicted next address is not present in 122.

When the cache line of the previously requested memory address does not have a valid short pointer to the requested memory address, method 100 moves to 130 to update the cache line of the previously requested memory address to have a valid short pointer to the currently requested memory address.

Next, method 100 moves to 132 to determine whether a response to a read request has been received from a next larger memory, such as from an L3 memory or a main memory. Method 100 also moves to 132 from 110 when no read request has been received, from 114 after a read request has been sent to larger memory, and from 126 when the cache line of the previously requested memory address has a valid short pointer to a predicted next memory address.

When a response to a read request has not been received in 132, method 100 returns to 110. When a response to a read request has been received in 132, method 100 moves to 134 to store the incoming memory address and entry in the cache. In addition, the valid pointer bit for the short pointer at incoming memory address and entry in the cache is cleared. Next, method 100 moves to 136 to output the entry to the next smaller cache. Method 100 then returns to 110.

The example of method 100 has a prefetch depth of one, e.g., a predicted next memory address and entry are pushed each time there is a cache hit to a cache line with a valid short pointer to a predicted next memory address. In an alternate embodiment, a sequence of memory addresses can be pushed each time there is a cache hit.

In an alternate embodiment, the smaller cache can use a separate buffer or status bits to track prefetched lines. Upon the first access to a prefetched line, the smaller cache can send a request to the larger cache emulating the miss that would have occurred. The larger cache then sends the next address in the sequence. This allows for more prefetch traffic to be generated. Ideally, no demand misses are necessary if the correlation is perfect. Additionally, it means that generated prefetches do not change the miss pattern, which would corrupt the prefetch state.

In another alternate embodiment, the unassigned bit in a 16-bit short pointer (16b in the example embodiment) can be assigned to be a confidence bit. Table 3 shows an alternate example of the 16 ways of a set 0 of a cache table, which includes a cache line with an entry valid bit, a memory address, an entry for data or an instruction, a short pointer to a predicted next memory address (set (10), way (4), valid pointer (1), confidence (1)).

TABLE 3

| Way (Cache Line) | Entry Valid | Memory Address | Entry Data/ Instruction | Short Pointer to Predicted Next Memory Address (Set, Way, Valid Pointer, Confidence) | Confidence |
| --- | --- | --- | --- | --- | --- |
| 1 | | | | | |
| 2 | | | | | |
| ... | | | | | |
| 16 | | | | | |

Alternately, as also shown in Table 3, confidence can instead be expressed as an additional multi-bit field. For example, a two-bit confidence field provides four confidence levels, while a three-bit confidence field provides eight confidence levels.

Figure 2:
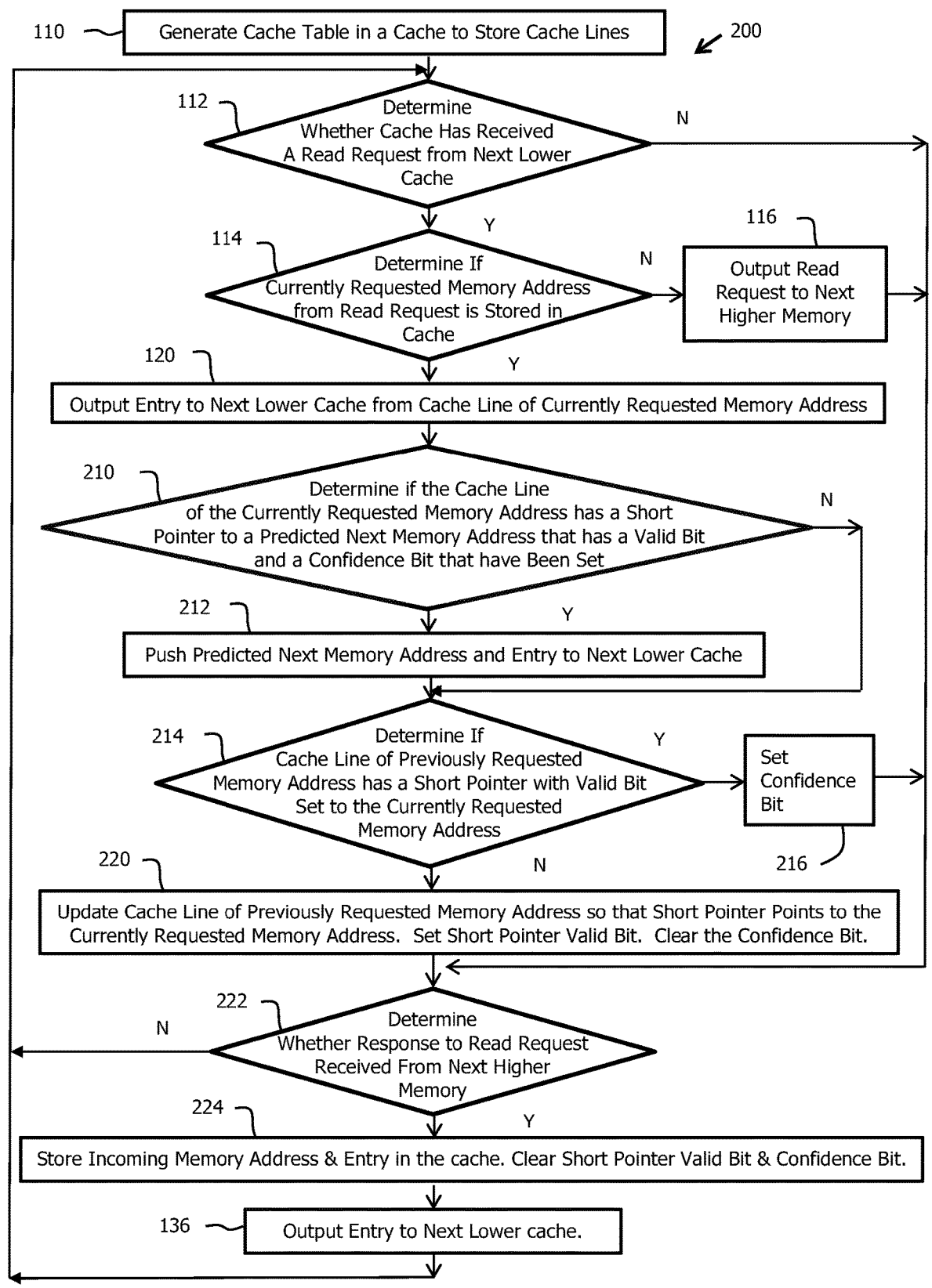
FIG. 2 is a flow chart illustrating an example of a method 200 of cache prefetching in accordance with an alternate embodiment of the present invention.

FIG. 2 shows a flow chart that illustrates an example of a method 200 of cache prefetching in accordance with an alternate embodiment of the present invention. Method 200 is similar to method 100 and, as a result, uses the same reference numerals to designate the steps that are common to both methods.

As shown in FIG. 2, method 200 first differs from method 100 after step 120 by moving to step 210 to determine whether the cache line of the currently requested memory has a short pointer to a predicted next memory address that has a valid pointer bit and a confidence bit that have been set. When the confidence bit has been set, method 200 moves to step 212 to push the predicted next memory address and entry from the cache to the next smaller cache.

Method 200 next moves to step 214 to determine whether the cache line of the previously requested memory address has a short pointer with the valid pointer bit set to the currently requested memory address, e.g., determine whether the short pointer (set, way) of the previously requested memory address matches the cache address (set, way) of the currently requested memory address. Method 200 also moves to step 214 from step 210 when the confidence bit has not been set.

When the cache line of the previously requested memory address has a short pointer to the currently requested memory address, method 200 moves to step 216 to set the confidence bit in the cache line of the previously requested memory address. When the cache line of the previously requested memory address does not have a short pointer to the currently requested memory address, method 200 moves to step 220 to update the cache line of the previously requested memory address so that the short pointer points to the currently requested memory address. Step 220 also sets the valid pointer bit, and clears the confidence bit. Method 200 moves from steps 216 and 220 to step 132.

Next, method 200 moves to 222 to determine whether a response to a read request has been received from a next larger memory or cache, such as from an L3 cache or a main memory. Method 200 also moves to 222 from 110 when no read request has been received, from 114 after a read request has been sent to a larger memory, and from 216 after the confidence bit has been set.

When a response to a read request has not been received in 222, method 200 returns to 110. When a response to a read request has been received in 222, method 200 moves to 224 to store the incoming memory address and entry in the cache. In addition, the valid pointer bit and the confidence bit for the short pointer at the incoming memory address and entry in the cache are cleared. Next, method 200 moves to 136 to output the entry to the next smaller cache. Method 200 then returns to 110.

For example, for an initial L1 Access A miss-L2 access A hit, method 200 determines that the confidence bit has not been set in step 210, so there is no prefetch write from L2 to L1 in step 212. Similarly, for an initial L1 Access B miss-L2 access B hit, method 200 also determines that the confidence bit has not been set in step 210, so there is no prefetch write from L2 to L1 in step 212. In step 214 for the L2 access B hit, method 200 determines that the A short pointer mismatches B, and in step 220 method 200 updates the cache line of A so that the A short pointer points to B, and clears the confidence bit of A.

For a second L1 Access A miss-L2 access A hit (second access of A) method 200 determines that the confidence bit has not been set in step 210, so there is no prefetch write from L2 to L1 in step 212. Similarly, for a second L1 Access B miss-L2 access B hit, method 200 again determines that the confidence bit has not been set in step 210, so there is no prefetch write from L2 to L1 in step 212. In step 214 for the L2 access B hit, method 200 determines that the A short pointer matches B, and in step 216 method 200 sets the confidence bit in the cache line of A.

For a third L1 Access A miss-L2 access A hit (third access of A) method 200 determines that the confidence bit has been set in step 210, and prefetch writes B from L2 to L1 in step 212. For a third access of B, the L1 Access B is a hit (from prefetch), which increases the L1 hit rate.

If an L1 Access C miss-L2 Access C hit subsequently follows an L1 Access A miss-L2 Access A hit, method 200 determines in step 214 that the that the A short pointer mismatches C, and in step 220 method 200 updates the cache line of A so that the A short pointer points to C, and clears the confidence bit of A.

Method 200 uses a single confidence bit solely because one bit in the 16-bit configuration is available and unused. Alternately, more than one confidence bit can be used to represent a confidence value or a confidence level if additional bits are available.

Figure 3A:
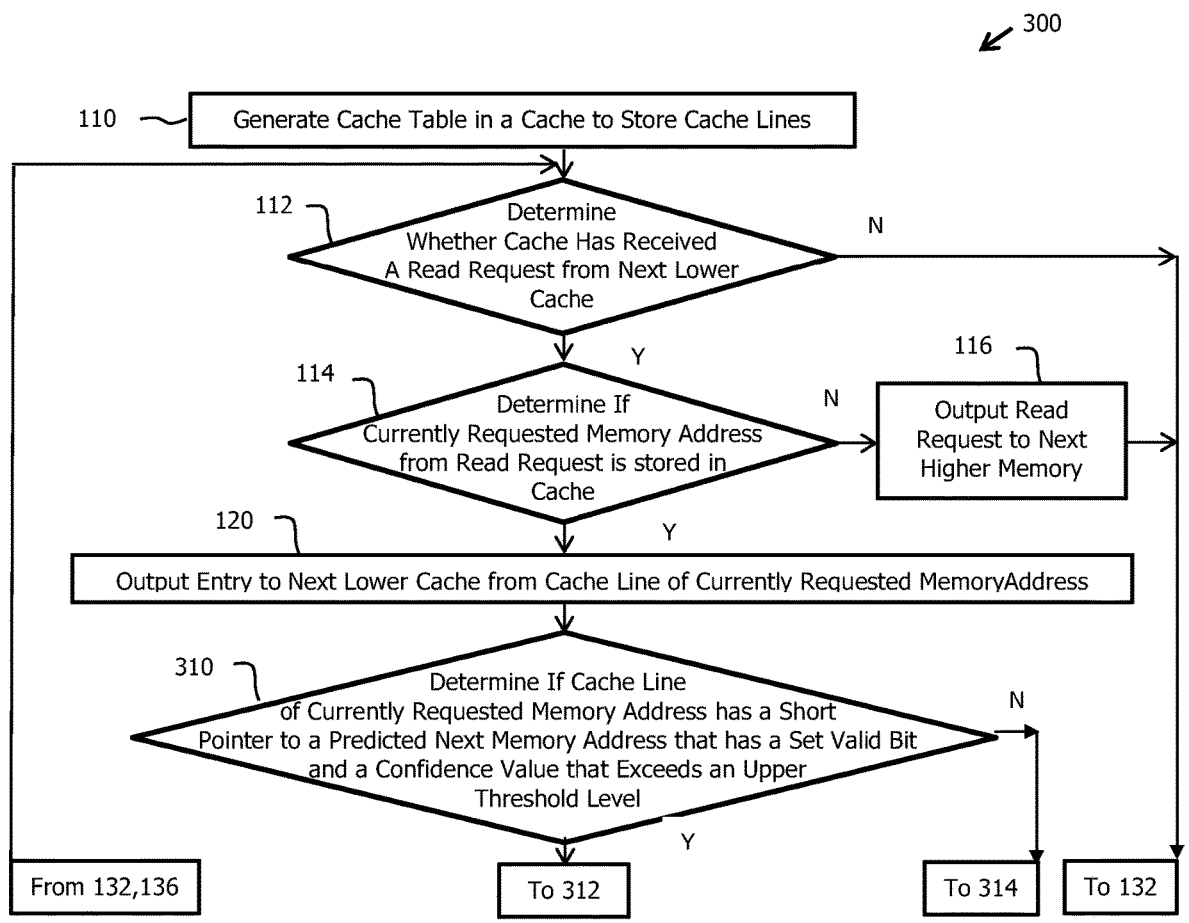
FIGS. 3A-3B are a flow chart illustrating an example of a method 300 of cache prefetching in accordance with an alternate embodiment of the present invention.
Figure 3B:
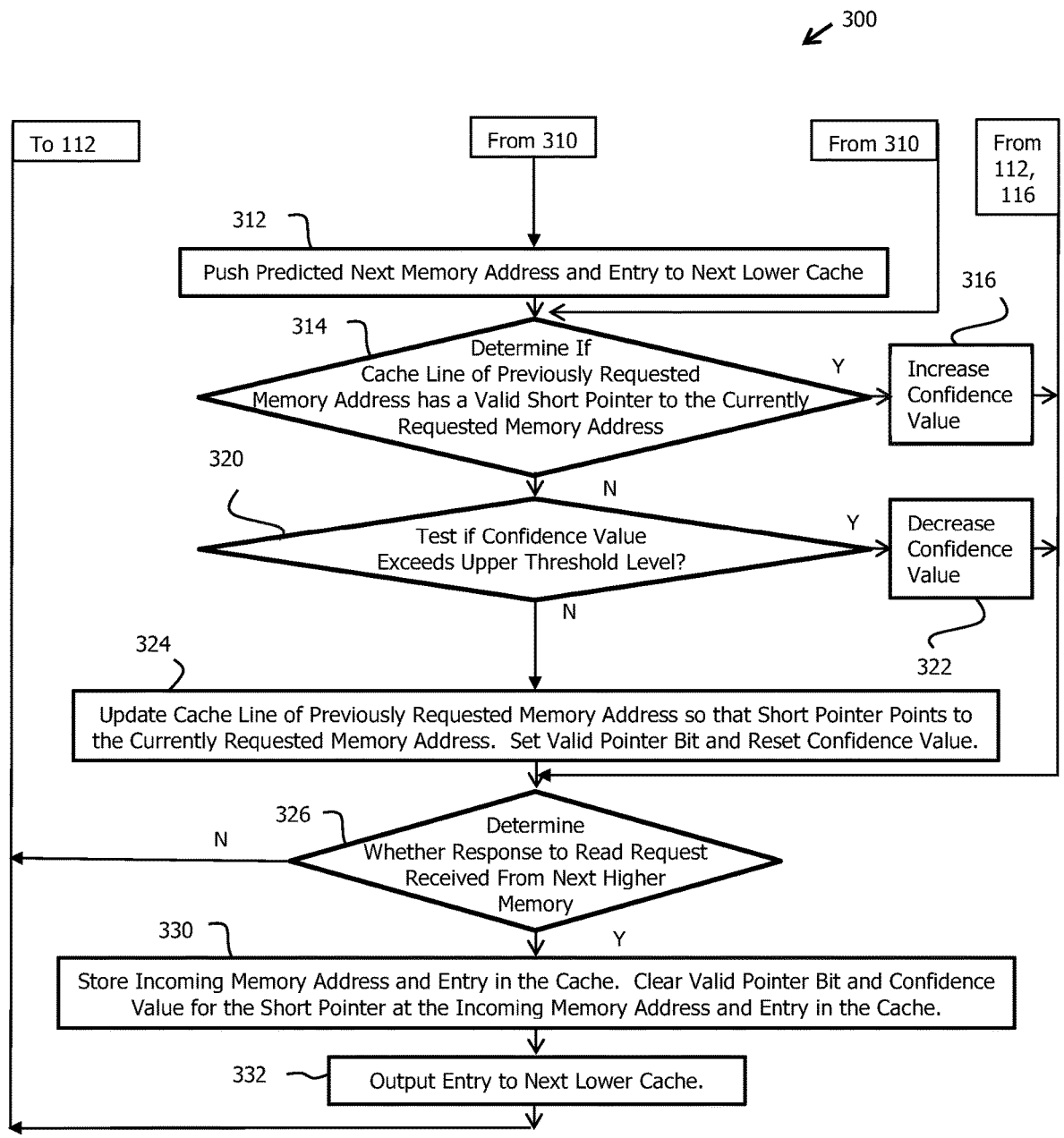

FIGS. 3A-3B show a flow chart that illustrates an example of a method 300 of cache prefetching in accordance with an alternate embodiment of the present invention. Method 300 is similar to method 200 and, as a result, uses the same reference numerals to designate the steps that are common to both methods.

As shown in FIGS. 3A-3B, method 300 first differs from method 200 after step 120 by moving to step 310 to determine whether the cache line of the currently requested memory address has a short pointer to a predicted next memory address that has a valid pointer bit that has been set and a confidence value that exceeds an upper threshold level. When the upper threshold level has been exceeded, method 300 moves to step 312 to push the predicted next memory address and entry from the cache to the next smaller cache.

Method 300 next moves to step 314 to determine whether the cache line of the previously requested memory address has a valid short pointer (set valid pointer bit) to the currently requested memory address, e.g., determine whether the short pointer (valid pointer, set, way) of the previously requested memory address matches the cache address (valid pointer, set, way) of the currently requested memory address. Method 300 also moves to step 314 from step 310 when the confidence value does not exceed the upper threshold level or the valid pointer bit is not set (not valid).

When the cache line of the previously requested memory address has a short pointer to the currently requested memory address, method 300 moves to step 316 to increase the confidence value in the cache line of the previously requested memory address. When the cache line of the previously requested memory address does not have a valid short pointer to the currently requested memory address, indicating that either the pointer did not match or was not valid, method 300 moves to step 320 to compare the confidence value against the upper threshold level.

When the confidence value exceeds the upper threshold level, method 300 moves to step 322 to decrease the confidence value but leave the short pointer unchanged. When the confidence value does not exceed the upper threshold, method 300 moves to step 324 to update the cache line of the previously requested memory address so that the short pointer points to the currently requested memory address. Method 300 also sets the valid pointer bit, and resets the confidence value for this entry.

Method 300 then moves to step 326 to determine whether a response to a read request has been received from a next larger memory, such as from an L3 memory or a main memory. Method 300 also moves to step 326 from 110 when no read request has been received, from 114 after a read request has been sent to the next larger memory, from 316 after the confidence value has been increased, and from 322 after the confidence value has been decreased.

When a response to a read request has not been received in 326, method 300 returns to 110. When a response to a read request has been received in 326, method 300 moves to 330 to store the incoming memory address and entry in the cache. In addition, the valid pointer bit and the confidence value for the short pointer at the incoming memory address and entry in the cache are cleared. Next, method 300 moves to 332 to output the entry to the next smaller cache. Method 300 then returns to 110.

Figure 4:
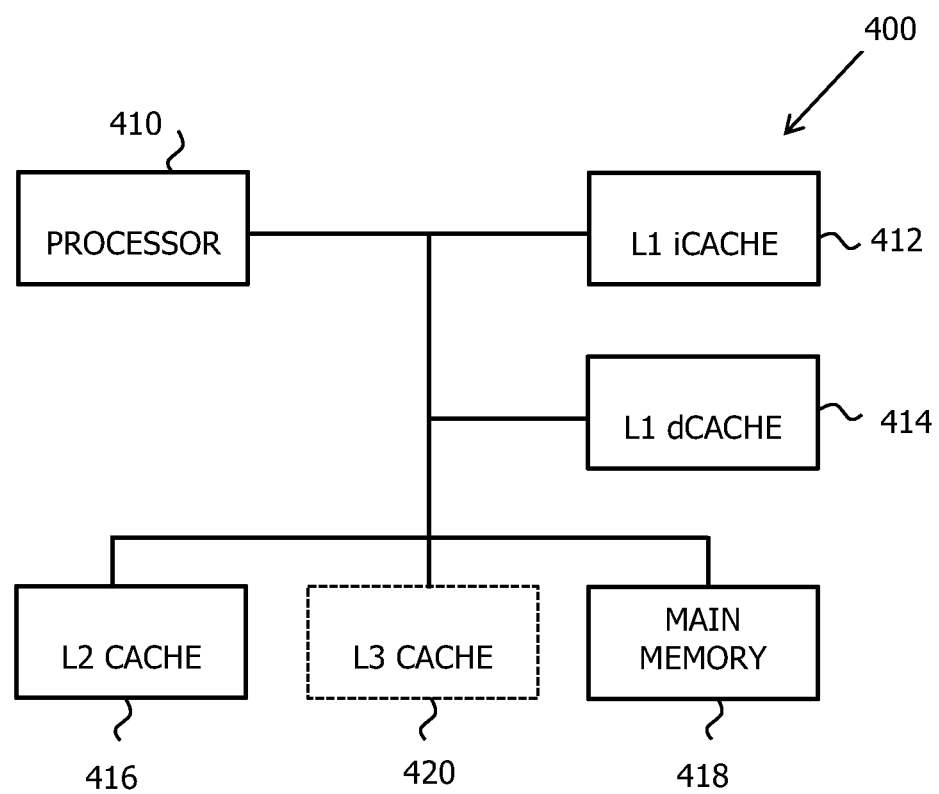
FIG. 4 is a block diagram illustrating an example of a computer system 400 in accordance with the present invention.

FIG. 4 shows a block diagram that illustrates an example of a computer system 400 in accordance with the present invention. As shown in FIG. 4, computer system 400 includes a processor 410, an L1 instruction cache (icache) 412 and an L1 data cache (dcache) 414 that are coupled to processor 410. In the present example, L1 icache 412 and L1 dcache 414 are logically organized as n-way set-associative devices which have a number of sets and a number of ways per set.

As further shown in FIG. 4, computer system 400 also includes an L2 cache 416 that is coupled to L1 icache 412 and L1 dcache 414, and a main memory 418, e.g., a hard drive, flash, PCM, that is coupled to L2 cache 416. Computer system 400 can alternately include an L3 cache 420 that is coupled to L2 cache 416 and main memory 418.

In the present example, L2 cache 416 and L3 cache 420 are also logically organized as an n-way set-associative device with a number of sets and a number of ways per set. In addition, when L2 cache 416 is coupled to a multi-core processor, where each core has separate L1 caches, L2 cache 416 stores information for each of the L1 caches.

Methods 100, 200, and 300 can be implemented by processor 410, or by dedicated controllers associated with the cache. Methods 100, 200, and 300 can also be stored on a non-transitory computer-readable medium that is operably coupled to the processor. The non-transitory computer-readable medium has computer-readable instructions stored thereon which, when accessed by the processor, cause the processor to execute methods 100, 200, and 300.

Reference has been made in detail to several embodiments. While the subject matter has been described in conjunction with an alternative embodiment, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the preceding detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description were presented and discussed in terms of a method. Although steps and sequencing thereof are disclosed in FIGS. 1, 2, and 3 herein describing the operations of these methods, such steps and sequencing are exemplary. Embodiments are well suited to performing various other steps or variations of the steps recited in the flowcharts of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result.

The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In a typical configuration, a computing device includes one or more processors (CPU), input/output ports, network ports, and memory. The memory may include volatile memory, random-access memory (RAM), and/or non-volatile internal memory of the computer-readable media, such as the read-only memory (ROM), or flash memory (flash RAM). The memory is an example of the computer-readable media.

The computer-readable media include permanent medium and non-permanent medium, movable and immovable medium, and can realize information storage by any mode or technology. The information can be a computer-readable command, data structure, program module, or other data. The examples of computer storage media include, but are not limited to, phase change memory (PCM), static random-access memory (SRAM), dynamic random-access memory (DRAM), other types of random-access memory (RAM), read-only memory (ROM), electrically erasable programmable read-only memory (EEPROM), flash memory or other internal memory technology, compact disk read-only memory (CD-ROM), digital versatile disc (DVD) or other optical storage, tape and cassette tape, magnetic tape or disk storage, or other magnetic storage device or any other non-transmission media which can be used for storing the information that can be accessed by the computing device. As defined in this article, the computer-readable media do not include transitory computer-readable media (transitory media), such as the modulation data signal and carrier wave.

It should also be noted that the terms "include," "contain," or any other variants are intended to cover the non-exclusive "containing" which makes the processes, methods, commodities, or devices having a series of elements include not only those elements, but also other elements not clearly set out, or the inherent elements of these processes, methods, commodities or devices. When there is no any further specification, the element specified by the sentence "including one . . . " does not rule out that there are other identical elements in the processes, methods, commodities, or devices including the elements.

A person skilled in the art shall understand that an embodiment of the invention can be provided as a method, a system, or a computer program product. Therefore, the invention can adopt a form of a full hardware embodiment, full software embodiment, or embodiments combining software with hardware. Furthermore, the invention can also adopt a form of computer program products implemented on one or more computer-readable storage media (including, but not limited to, magnetic disk memory, CD-ROM, and optical memory) containing computer-readable program codes.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of cache prefetching, the method comprising:
   determining whether a cache has received a read request from a next faster cache, the read request including a currently requested memory address;
   determining whether the currently requested memory address is stored in the cache when the read request has been received;
   outputting an entry associated with the currently requested memory address to the next faster cache when the currently requested memory address is stored in the cache;
   determining whether a cache line with the currently requested memory address has a valid short pointer pointing to a predicted next memory address; and
   pushing the predicted next memory address and an entry associated with the predicted next memory address to the next faster cache in response to determining that the cache line with the currently requested memory address has the valid short pointer.

2. The method of claim 1, further comprising determining whether a cache line with a previously requested memory address has a valid short pointer pointing to the currently requested memory address.

3. The method of claim 2, further comprising setting a confidence bit or increasing a multi-bit confidence value when the cache line with the previously requested memory address has the valid short pointer pointing to the currently requested memory address.

4. The method of claim 2, further comprising updating the cache line with the previously requested memory address so that the valid short pointer points to the currently requested memory address when the cache line with the previously requested memory address does not have the valid short pointer pointing to the currently requested memory address.

5. The method of claim 4, further comprising determining whether a response to a read request sent to a next slower memory or cache has been received.

6. The method of claim 5, further comprising storing a memory address and an entry incoming from the next slower memory or cache when the response has been received, and outputting the entry incoming from the next slower memory or cache to the next faster cache.

7. The method of claim 1, wherein the cache stores a plurality of cache lines, and wherein the valid short pointer points to another location in the cache.

8. A computer system, comprising:
a memory; and
a processor coupled to the memory to execute instructions stored in the memory, the processor configured to:
determine whether a cache has received a read request from a next faster cache, the read request including a currently requested memory address;
determine whether the currently requested memory address is stored in the cache when the read request has been received;
output an entry associated with the currently requested memory address to the next faster cache when the currently requested memory address is stored in the cache;
determine whether a cache line with the currently requested memory address has a valid short pointer pointing to a predicted next memory address; and
push the predicted next memory address and an entry associated with the predicted next memory address to the next faster cache in response to a determination that the cache line with the currently requested memory address has the valid short pointer.

9. The computer system of claim 8, wherein the processor is further configured to determine whether a cache line with a previously requested memory address has a valid short pointer pointing to the currently requested memory address.

10. The computer system of claim 9, wherein the processor is further configured to set a confidence bit or increase a multi-bit confidence value when the cache line with the previously requested memory address has the valid short pointer pointing to the currently requested memory address.

11. The computer system of claim 9, wherein the processor is further configured to update the cache line with the previously requested memory address so that the valid short pointer points to the currently requested memory address when the cache line with the previously requested memory address does not have the valid short pointer pointing to the currently requested memory address.

12. The computer system of claim 11, wherein the processor is further configured to determine whether a response to a read request sent to a next slower memory or cache has been received.

13. The computer system of claim 12, wherein the processor is further configured to store a memory address and an entry incoming from the next slower memory or cache when the response has been received, and outputting the entry incoming from the next slower memory or cache to the next faster cache.

14. The computer system of claim 8, wherein the cache stores a plurality of cache lines, and wherein the valid short pointer points to another location in the cache.

15. A non-transitory computer-readable medium having computer-readable instructions stored thereon which, when executed by a processor, cause the processor to execute a method of cache prefetching, the method comprising:
determining whether a cache has received a read request from a next faster cache, the read request including a currently requested memory address;
determining whether the currently requested memory address is stored in the cache when the read request has been received;
outputting an entry associated with the currently requested memory address to the next faster cache when the currently requested memory address is stored in the cache;
determining whether a cache line with the currently requested memory address has a valid short pointer pointing to a predicted next memory address; and
pushing the predicted next memory address and an entry associated with the predicted next memory address to the next faster cache in response to determining that the cache line with the currently requested memory address has the valid short pointer.

16. The non-transitory computer-readable medium of claim 15, wherein the method further comprises determining whether a cache line with a previously requested memory address and an entry to be pushed has a valid short pointer pointing to the currently requested memory address.

17. The non-transitory computer-readable medium of claim 16, wherein the method further comprises setting a confidence bit or increasing a multi-bit confidence value when the cache line with the previously requested memory address has the valid short pointer pointing to the currently requested memory address.

18. The non-transitory computer-readable medium of claim 16, wherein the method further comprises updating the cache line with the previously requested memory address so that the valid short pointer points to the currently requested memory address when the cache line with the previously requested memory address does not have the valid short pointer pointing to the currently requested memory address.

19. The non-transitory computer-readable medium of claim 18, wherein the method further comprises determining whether a response to a read request sent to a next slower memory or cache has been received.

20. The non-transitory computer-readable medium of claim 15, wherein the cache stores a plurality of cache lines, and wherein the valid short pointer points to another location in the cache.

* * * * *